United States Patent [19]
Nakura et al.

[11] 3,985,238
[45] Oct. 12, 1976

[54] INDUSTRIAL ROBOT

[75] Inventors: Kunihiro Nakura, Ibaragi;
Takayoshi Yoshimura, Settsu, both of Japan

[73] Assignee: Daikin Kogyo Co., Ltd., Osaka, Japan

[22] Filed: Mar. 5, 1975

[21] Appl. No.: 555,626

Related U.S. Application Data

[63] Continuation of Ser. No. 451,693, March 15, 1974, abandoned.

[30] Foreign Application Priority Data

Mar. 17, 1973 Japan................................ 48-31259

[52] U.S. Cl. ......................... 214/1 CM; 214/1 BD; 74/417; 74/750 R
[51] Int. Cl.²............................................. B25J 3/00
[58] Field of Search............ 214/1 BC, 1 BD, 1 CM; 74/417, 750 R

[56] References Cited
UNITED STATES PATENTS

| | | | |
|---|---|---|---|
| 3,572,807 | 3/1971 | Haaker et al.................... | 214/1 CM |
| 3,821,498 | 6/1974 | Schaefer et al................. | 214/1 CM |

FOREIGN PATENTS OR APPLICATIONS

| | | |
|---|---|---|
| 1,050,374 | 10/1951 | France |
| 1,299,266 | 6/1962 | France |
| 2,040,588 | 11/1971 | France |

*Primary Examiner*—Frank E. Werner
*Attorney, Agent, or Firm*—Cushman, Darby & Cushman

[57] ABSTRACT

An apparatus, or so-called industrial robot, grasping an object, transferring the same from a position to the other and performing preselcted actions at that position. The apparatus belongs to a technically different category from the conventional robots of circular cylindrical coordinates type and spherical coordinates type which are widely used in the industrial fields today. A joint shaft is arranged at the base end of an arm so that it is connected to a power unit. On the forward end of said arm is arranged other joint shaft so that other arm is jointed to the first mentioned arm at said other joint shaft. Said first mentioned arm also carries at the forward end thereof a further joint shaft for pivotably connecting a further arm. A mechanism for grasping the object to be transferred and/or handled is mounted on the forward end of said further arm. Said first mentioned arm, other arm and further arm are freely pivotable in a common plane around the axis of each of said first mentioned joint shaft, other joint shaft and further joint shafts, respectively, and form together an articulated arm assembly. The articulated arm assembly having the foregoing construction is quite similar in motion to the hand and arm of human body, and form the main portion of the articulated industrial robot.

9 Claims, 11 Drawing Figures

INDUSTRIAL ROBOT

This is a continuation of application Ser. No. 451,693, filed Mar. 15, 1974, abandoned upon the filing of this application.

This invention relates to a so-called industrial robot which can grasp an object, transfer the same from a position to the other and perform a preselected series of actions for handling the object at that position and, more particularly, to a novel multiple articulated type industrial robot which can perform properly a wide variety of actions corresponding to those provided by the hand and arm of human body. To allow the best use of the space and provide a high efficiency operation, the robot has a compact construction by concentrating the control units for the various robot actions in a single position.

The conventionally known industrial robots are either of a circular cylindrical coordinates type or a spherical coordinates type. The circular cylindrical coordinates type robot carries a finger section which can be opened and closed, twisted and also swung in one direction. The arm section connected to said finger section can be moved linearly up and down as well as forward and backward, and also can be twisted about its axis. Whereas, the spherical coordinates type robot provides a combination movement in both the horizontal and vertical directions as well as the movement in the forward and backward directions.

Each of these prior art apparatuses has both merits and demerits for use as an industrial labor saving means. With these conventional industrial robots it can hardly be expected to carry out complex modes of movements corresponding to those of hand and arm of human body.

A short point which is commonly involved in both types of conventional robots and has to be specifically mentioned herein is that they require a considerably large installation space compared with their operation space. In these conventional robots the finger section is so arranged that it can be operated by a piston slidably received in a cylinder having a preselected length. With this arrangement, even when the robot finger section needs to be operated only within an angle of 180° in the front side of the robot, a robot installation space equal to the forward and backward stroke of the arm section, or equal to the cylinder length, is required also in the rear side of the robot. In other words, the conventional robots require two times as large as installation spaced compared with its actual operation range.

The other disadvantages involved in the conventional robots are that the robot of circular cylindrical coordinates type has a too large vertical length at its central portion because the arm section needs to be moved in the vertical direction, and that the robot of spherical coordinates type can cover only a limited operation range because of a limited vertical swinging angle of the arm due to its configuration.

To eliminate these and other disadvantages of the conventional industrial robots an improved mechanism has been proposed heretofore, wherein the arm section is designed as an articulated arm so that it can additionally provide a stretching movement. However, this mechanism, which is provided with a lateral guide rail for the arm end for thereby attaining a reliable and smooth stretching movement of the arm section, is not very practical because of its complicated construction and limited movement.

The present invention is a result of a long and extensive studies which has been conducted in view of the foregoing for developing a novel industrial robot apparatus substantially free from said various disadvantages involved in the prior art industrial robots. The invention is directed to a mechanism belonging to a technical category which is quite different from the conventional robots in both construction and configuration.

It is a primary object of this invention to provide a multiple articulated type industrial robot which has a smooth and flexible movement resembling that of the upper limb of human body.

Another object of this invention is to provide such an industrial robot which has an almost equal operation space and installation space for thereby permitting the best use of the installation space.

Still another object of this invention is to provide an industrial robot which eliminates all the disadvantages involved in the conventional devices to provide excellent operation characteristics and allows a relative movement of the individual portions of the multiple articulated arm with a simple operation. This facilitates the setting work of the operation program.

A further object of this invention is to provide an industrial robot having a compact construction and a high efficiency operation by concentrating the control units thereof in a single position.

To attain these and other objects the present invention proposes a mechanism which is characterized in that a main arm and a subsidiary arm of equal length can be moved freely in a common plane. These arms are pivotably connected together end to end to form an articulated arm assembly. The whole arm assembly can be swung up and down by swinging up and down the base arm which is separately attached to the main arm. The articulated arm also provides a stretching movement, in which the forward end of the subsidiary arm can be moved toward and away from the base end of the main arm by use of an epicyclic gear system connecting the main arm to the subsidiary arm. In such a stretching movement the main arm alone is first swung up or down and then, by the action of the epicyclic gear system, the subsidiary arm is swung in the common plane and in the reverse direction for an equal angle with respect to the horizontal direction.

Another feature of this invention lies in that a grasping arm provided with a grasping mechanism is pivotably connected to the forward end of the subsidiary arm so that the grasping arm can be held in a preselected constant angular position irrespective of the swing-up and-down movement and stretching movement of the entire articulated arm. Besides, the apparatus of this invention can be swivelled in a horizontal plane intersecting, at right angles, the vertical plane in which the entire articulated arm swings up and down for stretching movement. Thus, the multiple articulated type robot of this invention can provide a three-dimensional movement.

Still another feature of this invention lies in that the grasping mechanism to be mounted on the grasping arm is so arranged as to be pivoted on the grasping arm shaft, for thereby maintaining the absolute inclination angle of the grasping arm irrespective of the stretching movement and swing-up and -down movement of the entire articulated arm. The entire articulated arm including said grasping arm can be swivelled in a substantially horizontal plane for thereby providing a three-dimensional movement.

To control the operation of such an articulated industrial robot in a simple and reliable manner, the motion transmission mechanism for the swing-up and -down movement and the stretching movement of the articulated arm as well as the motion transmission mechanism for the swing-up and -down movement and twisting movement of the grasping arm are respectively consisted of a gear train, each consisting of an epicyclic gear system, so that an improved smooth operation can be attained at the joint portions and the erroneous works which might occur due to the repeated usage can be minimized. Further, the construction of the robot can be made in compact by utilizing a connecting rod or rotary shaft in the gear trains so as to reduce the number of gears.

The invention will be described in detail first, with reference to the preferred embodiments illustrated in FIGS. 1–6. As is seen from FIG. 1 the industrial robot of this invention consists of an articulated arm A, a pair of swivel base block Y and a fixed base block X. Said articulated arm A consists of a base arm A1, a main arm A2, a subsidiary arm A3, a grasping arm A4 and a grasping mechanism A5. The base arm A1 is much shorter compared with the main arm A2 and subsidiary arm A3 and swingable only in the vertical plane as will be stated later. The main arm A2 and subsidiary arm A3 are made much longer than the base A1 and have an equal length (see FIG. 2), and correspond to the arm of human body. The grasping arm A4 corresponds to the hand; while the grasping mechanism A5, to the finger portion of the human body. The arms A1, A2, A3 and A4 are connected together in the following manner:

To the base end of the base arm A1 is arranged a first joint shaft B1 (see FIGS. 2 and 4) which is connected to a power unit, to the forward end of the base arm A1 is arranged a second or shoulder joint shaft B2 to which is pivoted the main arm A2, to the forward end of the main arm A2 is arranged a third or elbow joint shaft B3 to which is pivoted the subsidiary arm A3 and to the forward end of the subsidiary arm A3 is arranged a fourth or wrist joint shaft B4 to which is pivoted the grasping arm A4. The arms A1, A2, A3 and A4 are freely pivotable around an axis of each corresponding joint shafts B1, B2, B3 and B4 in a common plane. To provide an ability of placing an object grasped by the grasping mechanism A5 in a preselected place in the preselected position and/or handling the same in that place in the preselected manner, the industrial robot of this invention has five individual operation gear trains provided therein:

1. The first operation gear train serves to transfer an object grasped by the grasping mechanism A5 towards and away from the fixed base block X in a horizontal plane. More specifically, the first gear train is a so-called stretching movement gear train which operates, when the main arm A2 pivoted on the second joint shaft B2 arranged at the base end thereof is swung up or down for a certain angle, to swing down or up the subsidiary arm A3 pivoted on the third joint shaft B3 in the common plane for an equal angle.

2. The second gear train contributes to transfer the object in a vertical direction. When the second joint shaft B2 is moved around the first joint shaft B1 and the main arm A2 is swung up or down around the second joint shaft B2 in a common plane for a certain absolute angle, or an angle measured from the horizontal direction, the subsidiary arm A3 also swings up or down around the third joint shaft B3 in the common plane for an equal absolute angle. In other words, the second operation gear train may be called a swing-up or -down movement gear train which serves to swing up and down the main arm A2 and subsidiary arm A3 as if they were a straight one-piece member.

3. The third and fourth gear trains are respectively a swing-up and -down movement gear train and a twisting movement gear train for both of the grasping arm A4 and grasping mechanism A5. More specifically, these gear trains serve to hold the grasping arm A4 and grasping mechanism A5 in a predetermined position for thereby grasping the object to be transferred in a desired position and handling the same in a preselected manner.

4. The fifth gear train serves to rotate the rotary base block Y for 360° with respect to the fixed base block X so that the entire articulated arm as well as the object held by it can be rotated over 360° in the horizontal plane.

According to this invention an articulated arm which corresponds to the arm and hand of human body and consisting of four arm portions is operated by means of above-described five separate operation gear trains. To facilitate the understanding of this invention the construction, operation and effect of the apparatus of this invention will be described hereinunder, especially in connection with said five operation gear trains.

Figure 1:
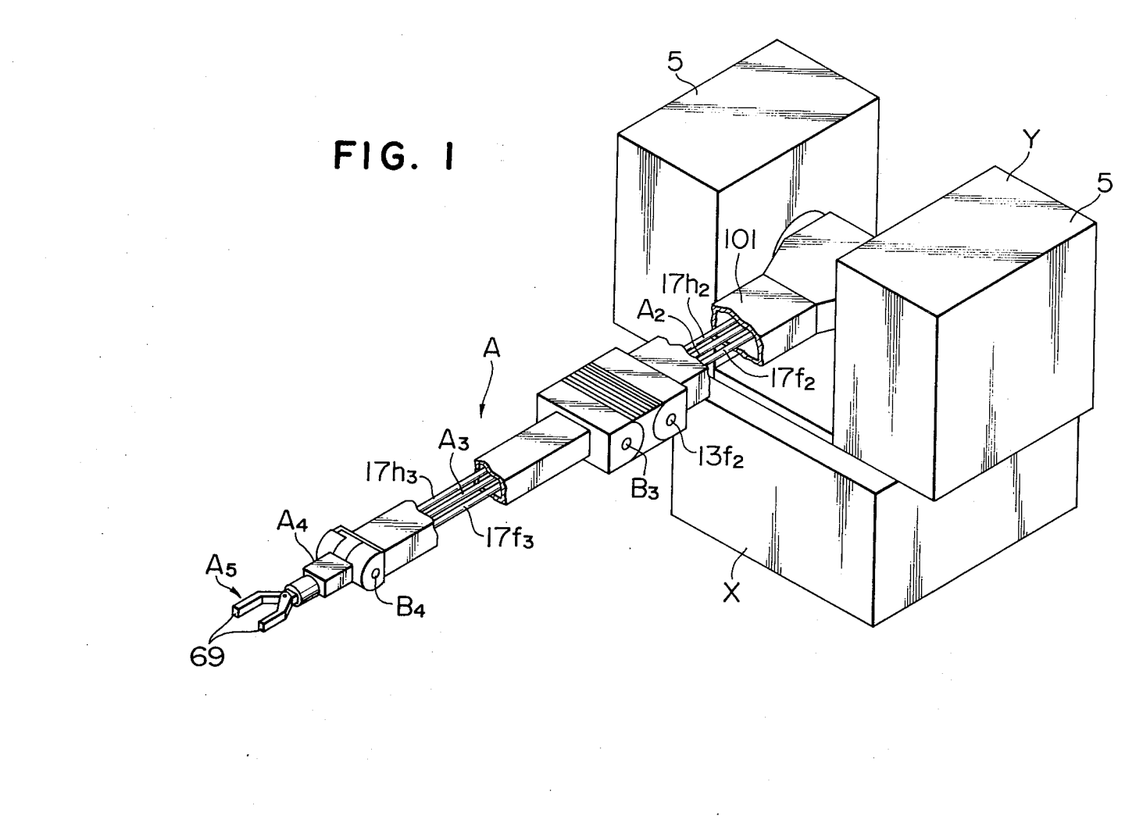
FIG. 1 is a partially fragmented perspective view of the entire industrial robot according to this invention.

First, the swivel gear train for swivelling the overall articulated arm A in a horizontal plane for 360° will be described. Referring to FIG. 1, the swivel base block Y is mounted on the horizontal top surface of the fixed base block X so that the bottom surface of the swivel base block Y and the top surface of the fixed base block X are in contact with each other. The swivel base block Y can be swivelled for 360° around a central vertical shaft (not shown) by means of a suitable drive mechanism. Between two support blocks 5 standing on either sides of the swivel base block Y is rotatably journalled the first joint shaft B1 of a suitable length. The articlated arm A is pivotably mounted on the first joint shaft B1. The overall swivel gear train is so arranged as to allow the rotary base block Y rotate horizontally together with the overall articulated arm A.

Next, the stretching movement gear train and swing-up and -down movement gear train will be described simultaneously. To facilitate the understanding of the operation of these gear trains, in the following description the expression of "rotation" of the arms and/or gears means that there is a visually perceivable difference in the position of the arms and/or gears before and after operation. In other words, the arms and/or gears are said to be rotated or not rotated depending on the change in their absolute angular position. For example, referring to the relationship between the subsidiary arm A3 and grasping arm A4, when the subsidiary arm A3 swings up and down, if the grasping arm A4 supported on the forward end of the subsidiary arm A4 is displaced together with the forward end of the subsidiary arm A3 while maintaining the horizontal position, then it will be said that the subsidiary arm A3 has been rotated, whereas the grasping arm A4 has not been rotated. So far as the relative position between the subsidiary arm A3 and the grasping arm A4 is connected, such an operation involves a change in the angular relation between these arms and hence both of the arms might seen to have been rotated. However, in the following description whether the arm and/or gear have been rotated or not will exclusively be judged based on the absolute angular position of the arm and-/or gear.

Figure 7:
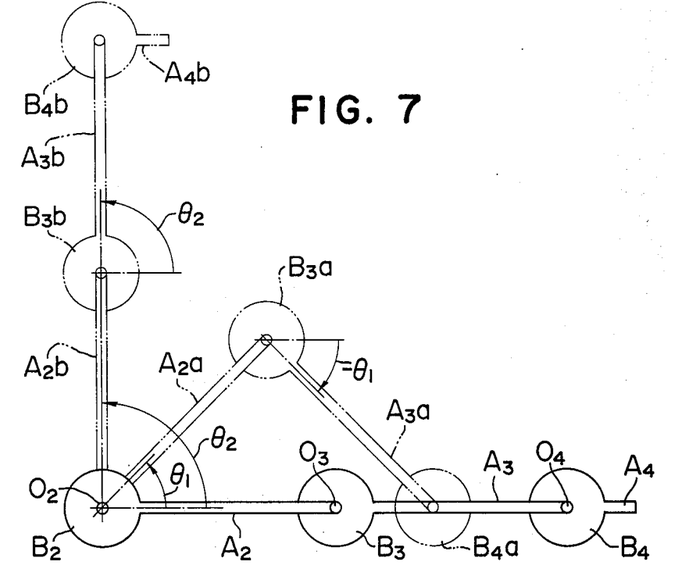
FIG. 7 is a view for explaining the operational principle of the multiple articulated arm according to this invention.

Now the fundamental conditions for effecting said swing-up and -down movement and stretching movement will be considered with reference to FIG. 7 which illustrates the operation principle of the articulated arm according to this invention. In the position where the main arm A2 and subsidiary arm A3 are extending along a horizontal straight line as shown by a real line, the line extending between the center O2 of the second joint shaft B2 for the main arm A2 and the center O4 of fourth joint shaft B4 arranged at the base end of the grasping arm A4 will be called a reference line. It will be apparent that every time when the grasping arm A4 is moved horizontally towards the center O2 of the second joint shaft B2 along said reference line, an equilateral triangle will be formed with a straight line extending along the reference line and having an arbitrary length as the base and the main and subsidiary arms A2 and A3 having an equal length as the oblique sides. Conversely, if the main and subsidiary arms A2 and A3 are moved relative to each other so that an equilateral triangle is defined by these arms and said reference line, then the grasping arm A4 will move horizontally along the reference line.

In FIG. 7 when the fourth joint shaft B4 of the grasping arm A4 is moved toward the position B4a as shown by the two-dotted chain line while maintaining the original absolute inclination of the grasping arm A4 irrespective of the stretching movement of the arms A3 and A4, the angle of rotation of the arms A2, A3 and A4 will be as follows:

Assuming that the second joint shaft B2 for the main arm A2 rotates counter-clockwise for an angle of $\theta$, then the third joint shaft B3 on which p, is pivoted the subsidiary arm A3 will be rotated in the same direction for an equal angle of $-\theta_1$, while the fourth joint shaft B4 on which is pivoted the grasping arm A4 will remain unrotated. The same is true to the rotation in the reverse direction.

Next, the consideration will be directed to the operation in which all the arms A2, A3 and A4 are swung up and down while maintaining the relative positional relationship between the main and subsidiary arms A2 and A3 unchanged and also maintaining the absolute angular position of the grasping arm A4 unchanged. For example, when the fourth joint shaft B4 on which is mounted the grasping arm A4 is moved toward the position B4b as shown by the two-dotted chain line, if the second joint shaft B2 for the main arm A2 is rotated counter-clockwise for an angle of $\theta2$, then the third joint shaft B3 on which is pivoted the subsidiary arm A3 will be rotated in the same direction for an equal angle $\theta2$, while the fourth joint shaft B4 on which is pivoted the grasping arm A4 will be maintained unrotated.

The foregoing angular change (or absolute angular position) of each arm in the stretching movement and swing-up and -down movement will be summerized as follows:

|  | Stretching movement | Swing-up and-down movement |
| --- | --- | --- |
| Main arm A2 | $+\theta1$ | $+\theta2$ |
| Subsidiary arm A3 | $-\theta1$ | $+\theta2$ |
| Grasping arm A4 | 0 | 0 |

Figure 8:
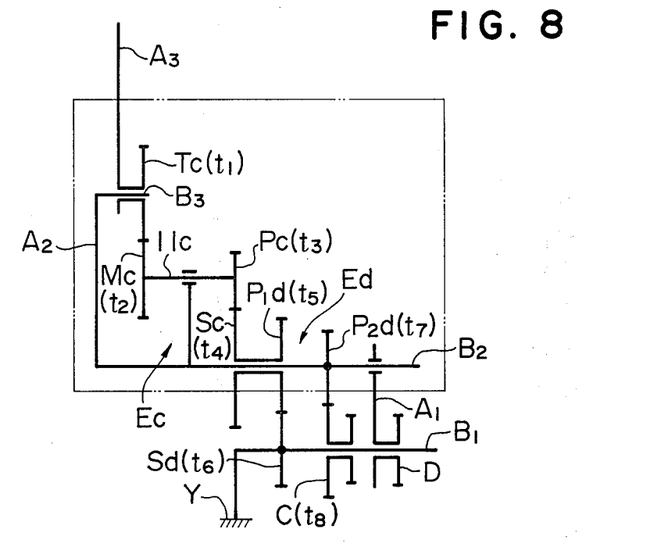
FIGS. 8, 9 and 10 are respectively views for explaining the operational principle of gear trains built into the multiple articulated arm.

To satisfy these conditions, an epicyclic gear system E having a special construction is arranged between every two adjacent joint shafts B. The individual gears are arranged in the special relationship to form epicyclic gear systems E. The function of these epicyclic gear systems will be described hereinunder with reference to FIG. 8 illustrating the operational principle of these gear systems.

In the illustration, the first joint shaft B1 fixed to the rotary base block Y carries a sun gear Sd fixed thereon and also rotatably carries a drive gear C of the stretching movement gear system and a drive gear D of the swing-up and -down gear system. The base arm A1 is integral with the drive gear D so that it operates in association with the drive gear D. Rotatably mounted on the base arm A1 is the second joint shaft B2 for the main arm A2, on which are rotatably mounted a sun gear Sc of the stretching movement gear system and a planet gear P1d which is integral with said sun gear Sc. The second joint shaft B2 also has an additional planet gear P2d fixedly mounted thereon. The planet gears P1d and P2d are engaged with the sun gear Sd and drive gear C, respectively. At a preselected longitudinal position on the main arm A2 is pivotably mounted a shaft 11C fixedly carrying a planet gear Pc and an intermediate gear Mc at the opposite ends thereof. The planet gear Pc is engaged with said sun gear Sc. On the forward end of the main arm A2 is fixedly mounted the third joint shaft B3 which pivotably supports the base end of the subsidiary arm A3, as well as a transmission gear Tc. In the gear train designed as above, the epicyclic gear system Ec for the stretching movement is consisted of the sun gear Sc, planet gear Pc, intermediate gear Mc and transmission gear Tc. These gears Sc, Pc, Mc and Tc are so designed as to have a gear ratio satisfying a relation of $(t2 \times t4)/(t1 \times t4) = 2$, wherein t4, t3, t2 and t1 represent the number of teeth carried on said gears Sc, Pc, Mc and Tc, respectively, in this order. The epicyclic gear system Ed for the swing-up and -down movement is consisted of a sun gear Sd, drive gear C, planet gears P1d and P2d. The gear ratio between these gears Sd, C, P1d and P2d satisfies a relation of $(t6 \times t7)/(t5 \times t8) = 1$, wherein t6, t8, t5 and t7 represent the number of teeth carried on said gears Sd, C, P1d and P2d, respectively, in this order.

Under these circumstances, while locking the sun gear Sd and base arm A1 or the drive gear D of the swing-up and -down movement gear system, if the drive gear C alone is rotated clockwise for one revolution (or −1 revolution), then the planet gear P2$d$ and hence the joint shaft B2 for the main arm A2 will be rotated counter-clockwise for $t8/t7$ revolutions ($\theta$ revolutions). At this time the transmission gear T$c$ and hence the joint shaft B3 for the subsidiary arm A3 rotates for $t8/t7 \times [1-(t2 \times t4)/(t1 \times t3)]$ revolutions. This means that the joint shaft B3 for the subsidiary arm A3 rotates clockwise for $t8/t7$ revolutions, or $-\theta$ revolutions (because $(t2 \times t4)/(t1 \times t3)$ equals 2 as mentioned previously). Compared with the Table set forth hereinbefore, it will be understood that these results satisfy the conditions for effecting the stretching movement.

On the other hand, while locking the sun gear S$d$ and drive gear C if the drive gear D of the swing-up and -down movement gear system is rotated counter-clockwise for one revolution (or 1 revolution), the base arm A1 will rotate around the first joint shaft B1, while the second joint shaft B2 will move around the first joint shaft B. As a result, the planet gear P2$d$ and the second joint shaft B2 for the main arm A2 will rotate counter-clockwise for $1 + t8/t7$ revolutions (or $1 + \theta$ revolutions), and the planetary gear P1$d$ simultaneously rotate for $1 + t6/t5$. Under these circumstances, the drive gear T$c$ rotates for $1 + t8/t7 + [(t2 \times t4)/(t1 \times t3)] \times (t6/t5 - t8/t7)$ revolutions. Since $t6/t5$ equals $t8/t7$, or $t6/t5 - t8/t7$ equals zero, the subsidiary arm A3 rotates counter-clockwise for $1 + t8/t7$ revolutions (or $1 + \theta$ revolutions). Compared with the Table set forth previously, it is apparent that this result satisfies the conditions for effecting the swing-up and -down movement. The foregoing stretching movement and swing-up and -down movement will be summerized as follows:

First, concerning the stretching movement. The power imparted from the not shown power unit to the drive gear C of the stretching movement gear system is transmitted to the planet gear P2$d$, or to the main arm A2 only, but not transmitted to the sun gear S$c$. Since the gears belonging to the epicyclic gear system E$c$ are engaged with each other at a specially selected gear ratio, the swing-up or -down movement of the main arm A2 around the second joint shaft B2 for a certain angle will accompany a rotation of the transmission gear T$c$ fixedly mounted on the base end of the subsidiary arm A3 for a corresponding angle in the same plane. In this case the transmission gear T$c$ rotates for an angle equal to the main arm 2 in the direction opposite to the rotation of the main arm A2. Accordingly, the subsidiary arm A3 swings up or down for an angle which is reversed in direction but equal in amount to that of the swinging movement of the main arm A2. This means that the main arm A2 and the subsidiary arm A3 carry out a stretching movement in the common plane.

In the swing-up and -down movement, on the other hand, the power imparted from the not shown power unit to the drive gear D of the swing-up and -down gear system is transmitted to the base arm A1 fixed to the drive gear D, so that the base arm A1 swings around the first joint shaft B1. This moves the second joint shaft B2 around the first joint shaft B1, thereby rotating the planet gears P1$d$ and P2$d$. In other words, upon swinging the main arm A2, the sun gear S$c$ rotates simultaneously. Since the gears S$d$ C, P1$d$ and P2$d$ are provided with preselected number of teeth, when the main arm A2 swings up or down around the second joint shaft B2 for a certain angle, the transmission gear T$c$ securely mounted on the base end of the subsidiary arm A3 will be rotated for a corresponding angle. The direction and angle of rotation of the transmission gear T$c$ are truely equal to those of the main arm A2. Accordingly, the subsidiary arm A3 and main arm A2 swing up and down in the common plane, in the same direction and for an equal angle to the main arm A2. This means that the main arm A3 swing up and down just as if they were a one-piece member.

Now the practical construction of these stretching movement gear train and the swing-up and -down movement gear train will be described with reference to FIGS. 2, 4 and 5, wherein the components having substantially similar functions to those of FIG. 8 are designated by like reference symbols. As for the connection manner between the shafts, gears and arms, there is some difference between the principle view and embodiment as will be stated later. Nevertheless, as for the functions of these shafts, gears and arms, there is no difference between the principle view and the embodiment. In the shown embodiment the gear ratio between the sun gear S$c$, planet gear P$c$, intermediate gear M$c$ and transmission gear T$c$, which compose the stretching movement gear train E$c$, is equal to that described hereinbefore with reference to the principle view. The same is true to the sun gear S$d$, drive gear C, planet gears P1$d$ and P2$d$, which compose the swing-up and -down movement epicyclic gear system E$d$.

Figure 2:
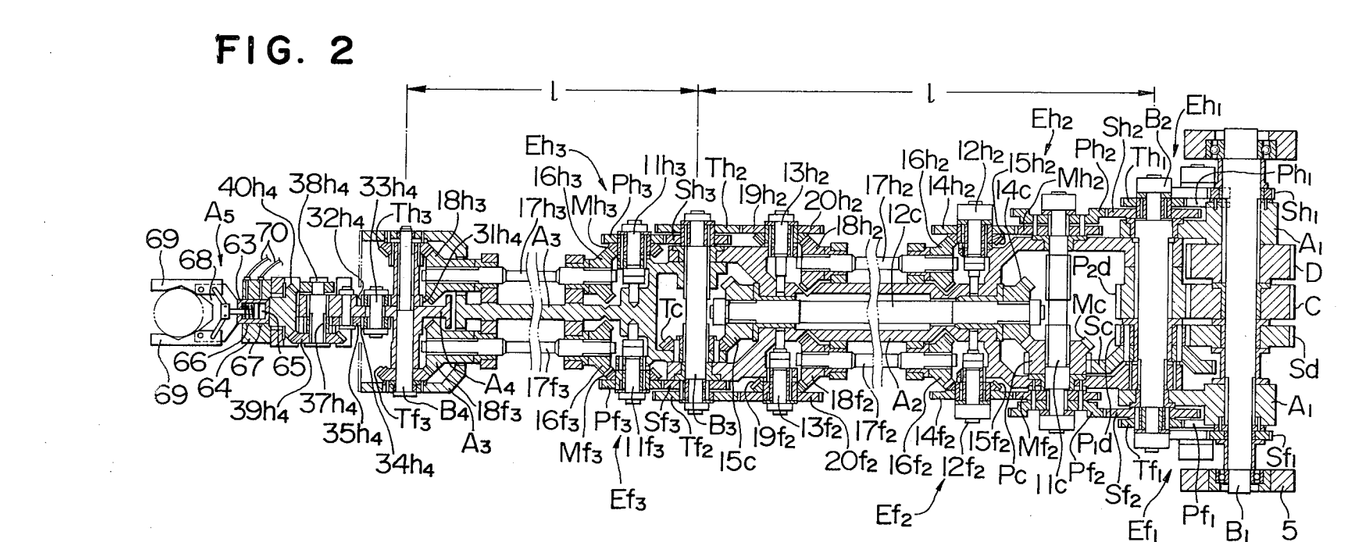
FIG. 2 is a longitudinal sectional view of the main portion of the industrial robot according to this invention.
Figure 3:
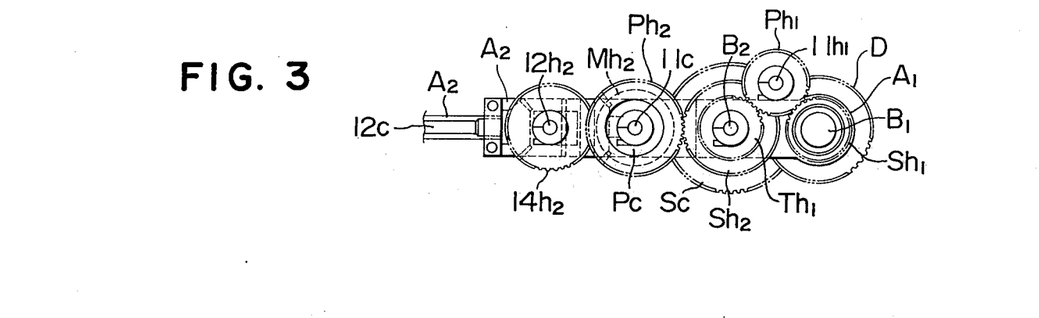
FIG. 3 is a partial elevation of the main portion shown in FIG. 2.
Figure 4:
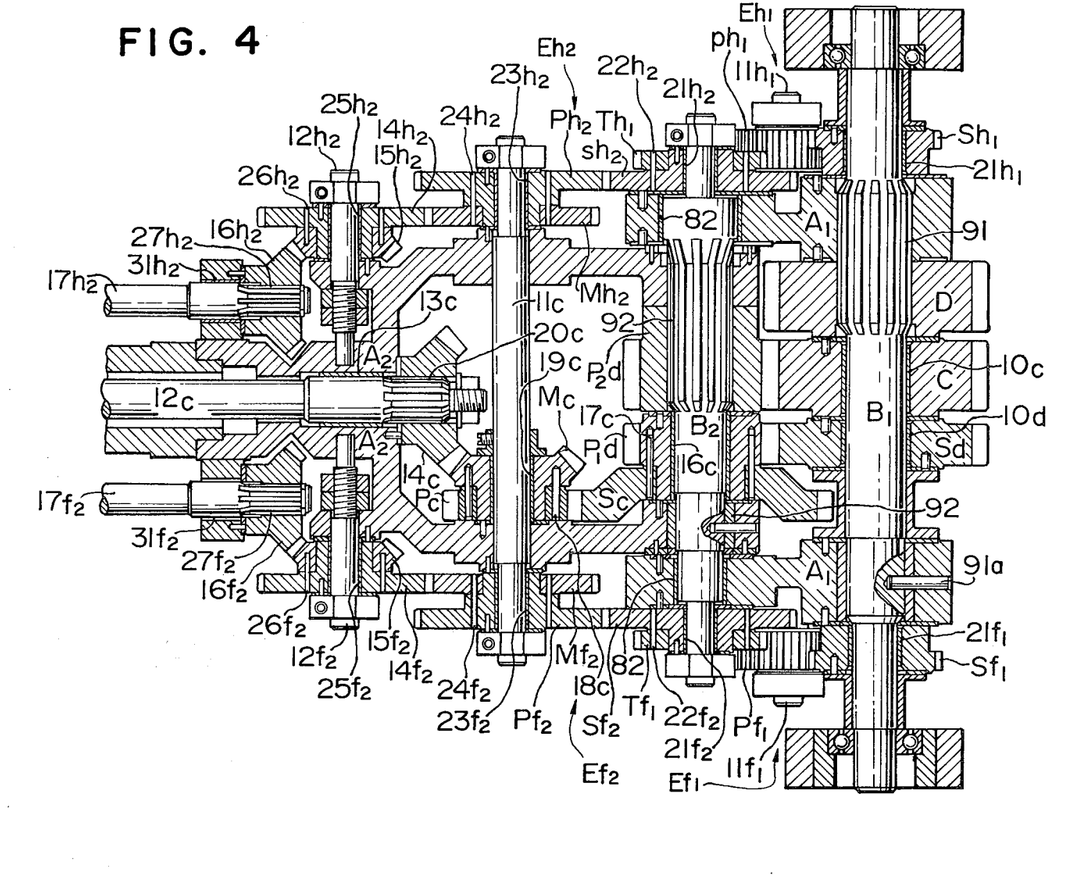
FIGS. 4, 5 and 6 are respectively partial enlarged views of the main portion shown in FIG. 2.

As is seen from FIGS. 2 and 4, the first joint shaft B1 mounted on the swivel base block Y has a pair of similar base arms A1 and three separate gears S$d$, C and D mounted on the first joint shaft B1 between said pair of base arms A1. The gears S$d$ and C have sleeves 10$d$ and 10C, respectively, received in their inner center holes so that they are freely rotatable wih respect to the first joint shaft B1. The drive gear D and pair of base arms A1 are operatively coupled to the first joint shaft B1 by means of a spline 91 or a pin 91A so that, at the time when the drive gear D rotates, the first joint shaft B1 and the pair of base arms A1 start rotating simultaneously.

The sun gear S$d$ is fixed to the swivel base block Y by use of any suitable means, so that it is held in a constant position with respect to the swivel base block Y irrespective of the rotation of the first joint shaft B1. The drive gear C adapted to make said articulated arm perform a stretching movement is engaged with a gear (not shown) mounted on the output shaft of a suitable drive unit such as a pulse motor, and forms a starting member of the power transmission system for making the articulated arm A perform a stretching movement.

The drive gear D adapted to make the articulated arm A perform a swing-up and -down movement is connected to another drive unit in the similar manner as the drive gear C, forming the starting member of the swing-up and -down movement transmission system for the articulated arm A.

The second joint shaft B2 arranged at the base end of the main arm A2 is supported in the horizontal position by the forward ends of the pair of base arms A1, so that the second joint shaft B2 can be moved around the frist joint shaft B1 while being held in a horizontal position.

Between the pair of base arms A1 and the second joint shaft B2 are arranged a pair of sleeves 82 so that the second joint shaft can be rotated freely with respect to the base arms A1.

Now the main arm A2 which is a component of the multiple articulated arm A will be described. As is seen from FIG. 1 the main arm A2 extends along a line intersecting the first joint shaft B1 at right angles. The main arm A2 includes a cover 101 for enclosing the entire main arm A2, and a gear train which will be described later.

As is best seen from FIG. 4 the main arm A2 is mounted at its base end on the second joint shaft B2 so that they are fixed together by use of a pair of splines 92. Within a hollow internal portion of the main arm A2 is received a stretching movement gear train for transmitting the rotation of the drive gear C to the main arm A2 and subsidiary arm A3. In the longitudinal preselected position on the main arm A2 is arranged a fixed shaft 11c in parallel relation with the second joint shaft B2. The main arm A2 also carries on its forward end the third joint shaft B3 which extends parallel to the second joint shaft B2. The third joint shaft B3 is mounted on the main arm A2 by way of a pair of sleeves 83 (FIG. 5) so that the third joint shaft B3 is freely rotatable with respect to the main arm A2. The main arm A2 also carries an axially extending rotary shaft 12c. The rotary shaft 12c is mounted on the main arm A2 by use of a pair of sleeves 13c, 13c (FIGS. 4 and 5) so that it is freely rotatable.

In conjunction with the foregoing shafts are arranged the stretching movement gear train and a portion of the swing-up and -down movement gear train composed of the planet gears P1d, P2d, sun gear Sc, planet gear Pc, intermediate gear Mc, transmission gear Tc and gears 14c, 15c. As is seen from FIG. 4 the planet gears P1d and P2d are mounted on the second joint shaft B2. The planet gear P2d is fixed to the second joint shaft B2 by means of a spline 92 and engaged with the arm stretching drive gear C mounted on the first joint shaft B1. Between the planet gear P1d and the first joint shaft B2 is arranged a sleeve 16c which allows the planet gear P1d to rotate freely. The sun gear Sc mounted on the reduced diameter portion of the planet gear P1d is fixed to it by use of a pin 17c so that these gears P1d and Sc can be rotated together. The planet gear P1d is engaged with the sun gear Sd on the first joint shaft B1, whereas the sun gear Sd is engaged with the planet gear Pc on the fixed shaft 11c.

The intermediate gear Mc and the planet gear Pc mounted on the reduced diameter portion of the intermediate gear Mc are fixedly held together by means of a pin 18c so that they are rotatable together. Between the intermediate gear Mc and fixed shaft 11c is inserted a sleeve 19c so that the intermediate gear Mc can be rotated freely. The intermediate gear Mc is engaged with the gear 14c which is fixedly mounted on the rotary shaft 12c by means of a spline 20c. As is seen from FIG. 5 the gear 15c is mounted on the forward end of the rotary shaft 12c by use of a spline 21c and engaged with the transmission gear Tc which is fixedly mounted on the third joint shaft B3.

In the similar manner as is described previously with reference to the principle view, the stretching movement epicyclic gear system Ec is consisted of the sun gear Sc, planet gear Pc, intermediate gear Mc and transmission gear Tc. These gears are so selected that they have a gear ratio satisfying a relation of $(t2 \times t4)/(t1 \times t3) = 2$, wherein $t1$, $t2$, $t3$ and $t4$ represent the number of teeth carried on the transmission gear Tc, intermediate gear Mc, planet gear Pc and sun gear Sc, respectively, in this order.

Similarly, the epicyclic gear system Ed for the swing-up and -down movement is composed of the sun gear Sd, drive gear C, planet gears P1d and P2d. These gears are so selected that they have a gear ratio satisfying a relation of $(t6 \times t7)/(t5 \times t8) = 1$, wherein $t6$, $t8$, $t5$ and $t7$ represent the number of teeth carried on the sun gear Sd, drive gear C, planet gears P1d and P2d, respectively, in this order. The advantages provided by the foregoing gear arrangement will be summarized as follows:

1. The swing-up and -down movement and stretching movement of the multiple articulated arm can be controlled separately or simultaneously. In the swing-up and -down movement, the articulated arm composed of the main arm A2 and subsidiary arm A3 can be swung up and down around the first joint shaft B1 in such a manner as if they were a one-piece member; whereas in the stretching movement, the forward end of the subsidiary arm A3 moves to and away from the second joint shaft B2 along a line extending radially from the center of the second joint shaft B2, said swinging movement and stretching movement can either simultaneously or individually be controlled. The foregoing means that the movement of the articulated arm can be controlled by a single compact control unit.

2. In addition, the gear system is so arranged that the second joint shaft B2 and the corresponding joint portions between the main and subsidiary arms A2 and A3 include rotary gears only. Therefore, larger effective rotary angles can be obtained in both the swing-up and -down movement and stretching movement.

Figure 11:
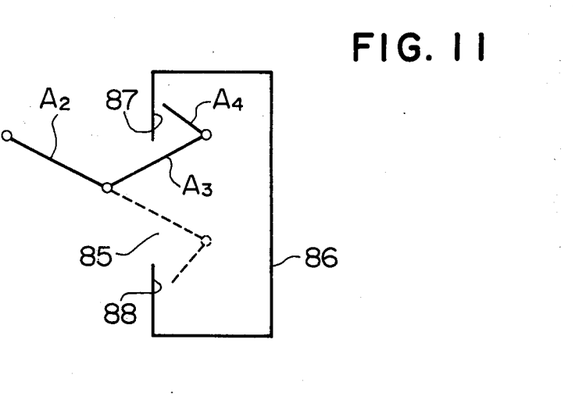
FIG. 11 is a schematic view for explaining the features of the multiple articulated arm.

3. In the stretching movement, the main and subsidiary arms A2 and A3 can be bent either into a center-elevated (∧) or center-depressed (∨) configuration. When it is required to carry out a predetermined operation in the inside space 87 of the front upper wall or in the inside space 88 of the front lower wall of such a casing 86 having a window as shown in FIG. 11, the known prior art circular cylindrical coordinates type robot and/or spherical coordinates type robot are quite useless because of their limited operation space. In contrast with this, the industrial robot equipped with a multiple articulated arm of this invention can be operated as if it were an alive human hand and arm, providing an improved flexibility in operation and covering a much increased operation space.

In FIG. 4 the planet gear P1d on the second joint shaft B2 is engaged with the sun gear on the first joint shaft B1. Alternatively, eliminating the planet gear P1d, the sun gear Sc on the second joint shaft B2 may be directly engaged with the sun gear Sd on the first joint shaft B1. In this case, the gear ratio between the sun gears Sc and Sd, planet gear P2d and drive gear C may be selected so as to satisfy a relation of $t6 \times t7/t4 \times t8 = 1$, wherein $t4$, $t6$, $t7$ and $t8$ represent the number of teeth carried on the sun gears Sc and Sd, planet gear P2d and drive gear C, respectively, in this order. Furthermore, the connecting manner between each joint shaft B and the corresponding arm A may be reversed or modified suitably.

For example, instead of fixing the drive gear D and the base arm A1 to the first joint shaft B1 by means of a spline 91, it is possible to rotatably mount the drive gear D and the base arm A1 on the first joint shaft B1 while rigidly connecting the drive gear D and the base arm A1 by means of a pin or the like. Further, such alternation may also be applied to the second joint shaft B2, the planet gear P2 and the main arm A2. Still further, when the transmission gear Tc and the subsidiary arm A3 are rigidly connected by means of a pin or the like, the third joint shaft B3 may be rotatable around either arms A2, A3, or may be rigidly connected to the main arm A2.

Now the gear train for the swing-up and -down movement and the gear train for the twisting movement of the grasping arm A4 will be described. These gear trains serve to hold the grasping arm A4 and grasping mechanism A5 in an absolute angular position or in a controlled angular position, irrespective of the swing-up and -down movement and stretching movement of the base arm A1, main arm A2 and subsidiary arm A3.

Referring to the principle view of FIG. 9, the function of these gear trains will be explained. The illustrated gear system consists of a casing 73, power shaft 71 fixed to said casing 73, sun gear S rotatably mounted on said power shaft 71, planet gear P which, in engagement with said sun gear S, moves around said power shaft 71, intermediate gear M coaxially coupled to said planet gear P, transmission gear T which, in engagement with said intermediate gear M, moves around said power shaft 71, and follower shaft 72 fixedly connected to said transmission gear T so as to rotate on its own axis and move around said power shaft 71 together with the transmission gear T.

The foregoing gear train provides epicyclic gear systems $Ef$ and $Eh$ for the swing-up and -down movement and twisting movement of the grasping arm. The gear ratio between the transmission gear T, intermediate gear M, planet gear P and sun gear S is so selected as to satisfy a relation of $(t1' \times t3')/(t2' \times t4') = 1$, wherein $t1'$, $t2'$, $t3'$ and $t4'$ represent the number of teeth carried on said gears T, M, P, and S, respectively, in this order. Under these conditions, when the power shaft 71 is rotated for one revolution while fixing the sun gear S, the transmission gear T rotates for $1 - (t1' \times t3')/(t2' \times t4')$, but zero revolution when $(t1' \times t3')/(t2' \times t4') = 1$ as discussed as above. In other words, even when the casing 73 is rotated around the power shaft 71, the planet gear P only moves parallel without rotating, unless the sun gear S is rotated.

If the sun gear is rotated while maintaining the casing 73 in a fixed position, the transmission gear T will be rotated in the same direction for an equal angle. It will be apparent from the foregoing that the epicyclic gear systems $Ef$ and $Eh$ provide also the motion transmission function.

Figure 9:
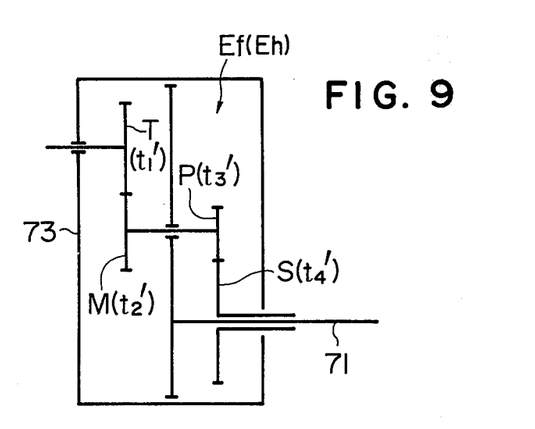
Figure 10:
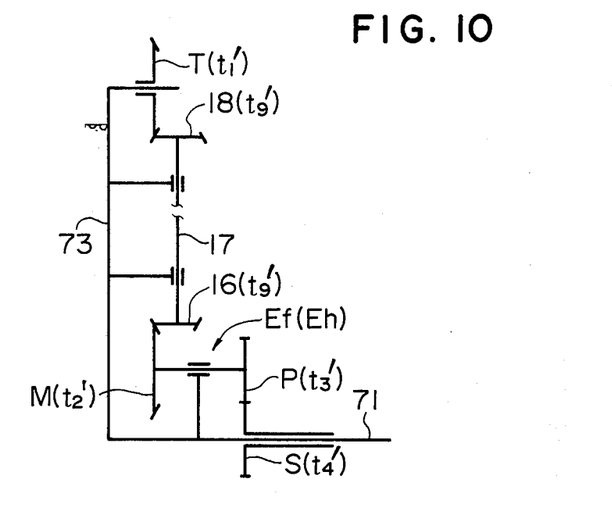

Illustrated in FIG. 10 is a modification of the device shown in FIG. 9, wherein bevel gears 16, 18 and shaft 17 employed as the intermediate means between the transmission gear T and intermediate gear M. The pair of bevel gears carry an equal number of teeth. With such an arrangement, the distance between the gears M and T is increased, and the casing 73 and, accordingly, the arms A2 and A3 may be extended to any desired length. It will be needless to say that the modified embodiment of FIG. 10 provides similar functions to the embodiment of FIG. 9. The epicyclic gear system $Ef$ having described construction and function is arranged between the first and second joint shafts B1 and B2, between the second and third joint shafts B2 and B3, and between the third and fourth joint shafts B3 and B4, for thereby connecting these pairs of joint shafts. With such an arrangement the swing-up and -down movement of the base arm A1, main A2 and subsidiary arm A3 does not have any influence over the grasping arm A4. Besides, by rotating the sun gear Sf1 on the first joint shaft B1, the absolute angular position of the grasping arm A4 can be controlled as desired, irrespective of the articulation movement of the arms A1, A2 and A3.

In the same manner, every two adjacent joint shafts B are connected together also by means of the epicyclic gear system $Eh$, so that the swing-up and -down movement of the base arm A1, main arm A2, subsidiary arm A3 and grasping arm A4 does not have any influence over the twisting movement of the grasping mechanism A5. Besides, by rotating the sun gear Sh1 on the first joint shaft B1, the absolute angular position of the grasping mechanism A5 can be controlled as desired, irrespective of the swing-up and -down movement of the arms A1, A2, A3 and A4.

The practical arrangement of the swing-up and -down movement gear train for the grasping arm A4 will be described with reference to FIGS. 2, 4, 5 and 6, wherein the components having similar functions to those shown in FIGS. 9 and 10 are designated by like reference symbols. The swing-up and -down movement gear train for the grasping arm A4 is composed of a number of gears mounted on the base arm A1, main arm A2 and subsidiary arm A3.

First, an epicyclic gear system Ef1 built into the base arm A1 and main arm A2 will be described. Corresponding to the sun gear S and transmission gear T illustrated in the principle view, a sun gear Sf1 and transmission gear Tf1 are mounted on the first joint shaft B1 for the base arm A1 and the second joint shaft B2 for the main arm A2. Corresponding to the planet gear P and intermediate gear M in the principle views is mounted a single planet gear Pf1 on a fixed shaft 11f in the base arm A1. The planet gear Pf1 has functions of both the planet gear P and intermediate gear M and is engaged with the sun gear Af1 and transmission gear Tf1. The sun gear Sf1 and transmission gear Tf1 carry an equal number of teeth. Therefore, there exists a relation of $(t1' \times t3')/(t2' \times t4') = 1$ between the number of teeth carried on the gears which compose the epicyclic gear system Ef1 arranged in the base arm A1 and main A2. Under these conditions, even if the base arm A1 rotates, the tranmission gear Sf1 does not rotate. Between the sun gear Sf1 and first joint shaft B1 is inserted a sleeve 21f1 and between the planet gear Pf1 and fixed shaft 11f1 is inserted another sleeve (not shown), so that the gears Sf1 and Pf1 are freely rotatable on their corresponding shafts.

Now, the epicyclic gear system Ef2 arranged in the main arm A2 and subsidiary arm A3 will be described. Corresponding to the sun gear S in the principle views is a sun gear Sf2 mounted on the second joint shaft B2 for the main arm A2. A planet gear Pf2 and intermediate gear Mf2 mounted on the fixed shaft 11c arranged on the main arm A1 in a desired longitudinal position correspond to said planet gear P and intermediate gear M, respectively. A transmission gear Tf2 mounted on the third joint shaft B3 for the subsidiary arm A3 corresponds to said transmission gear T. These gears Sf2, Pf2, Mf2 and Tf2 included in the epicyclic gear system Ef2 arranged in the main and subsidiary arms A2 and A3 are so designed that they satisfy a relation of $(t1' \times t3')/(t2' \times t4') = 1$. Between the intermediate gear Mf2 and transmission gear Tf2 are arranged a series of gears 14f2, 15f2, 16f2, 18f2, 19f2 and 20f2, which transmit the rotation of gear 14f2 to the gear 19f2 without any increasing or reducing the number of revolution. With the foregoing arrangement, even when the main arm A1 is rotated, the transmission gear Tf2 will not change its absolute angular position so long as the sun gear S$f$2 remains unrotated.

In the embodiment of FIG. 4 the transmission gear T$f$1 is fixedly mounted on the reduced diameter portion of the sun gear S$f$2 by means of a pin 22$f$2 so that they are rotatable together. Between the sun gear S$f$2 and second joint shaft B2 is inserted a sleeve 21$f$2 and between the planet gear P$f$2 and fixed shaft 11$c$ is inserted a sleeve 23$f$2. An intermediate gear M$f$2 is fixedly mounted on the reduced diameter portion of the planet gear P$f$2 by means of a pin 24$f$2 so that they are rotatable together. Gears 14$f$2 and 20$f$2 are mounted on the fixed shafts 12$f$2 and 13$f$2, respectively, by use of sleeves 25$f$2 and 30$f$2, respectively. Bevel gears 15$f$2 and 19$f$2 are fixedly mounted on the reduced diameter portion of the gears 14$f$2 and 20$f$2, respectively, by means of pins 26$f$2 and 29$f$2, respectively, so that these pairs of gears 14$f$2 15$f$2 and 19$f$2 and 20$f$2 are rotatable together. Between the subsidiary arm A2 and rotary shaft 17$f$2 are arranged sleeves 31$f$2 and 32$f$2. On the splines 27$f$2 and 28$f$2 arranged on either ends of the rotary shaft 17$f$2 are mounted bevel gears 16$f$2 and 18$f$2, respectively. To transmit the rotation of gear 14$f$2 to the gear 19$f$2 without increasing or reducing the number of revolution, each pair of gears 14$f$2 and 20$f$2, 15$f$2 and 19$f$2, 16$f$2 and 18$f$2 carry an equal number of teeth.

Now, the epicyclic gear system E$f$3 arranged in the subsidiary and grasping arms A3 and A4 will be described. A sun gear mounted on the third joint shaft B3 for the subsidiary arm A3 corresponds to the sun gear S shown in the principle views. A planet gear P$f$3 and intermediate gear M$f$3 mounted on the fixed shaft 11$f$3 arranged in a preselected longitudinal position of the subsidiary arm A3 correspond, respectively, to said planet gear P and intermediate gear M. A transmission gear T$f$3 mounted on the fourth joint shaft B4 for the grasping arm A4 corresponds to said transmission gear T. These gears S$f$3, P$f$3, M$f$3 and T$f$3 which compose the epicyclic gear system E$f$3 arranged in the subsidiary and grasping arms A3 and A4 are so selected that they satisfy a relation of $(t1' \times t3')/(t2' \times t4') = 1$. In the shown embodiment, gears 16$f$3 and 18$f$3 are arranged between the intermediate gear M$f$3 and transmission gear T$f$3. These gears 16$f$3 and 18$f$3 have an equal number of teeth, so that the rotation of gear 16$f$3 is transmitted to the gear 18$f$3 without reducing or increasing the number of revolution. With the foregoing arrangement, even when the subsidiary arm A3 is rotated, the transmission gear T$f$3 will not change its absolute angular position so long as the sun gear S$f$3 remains unrotated.

Figure 5:
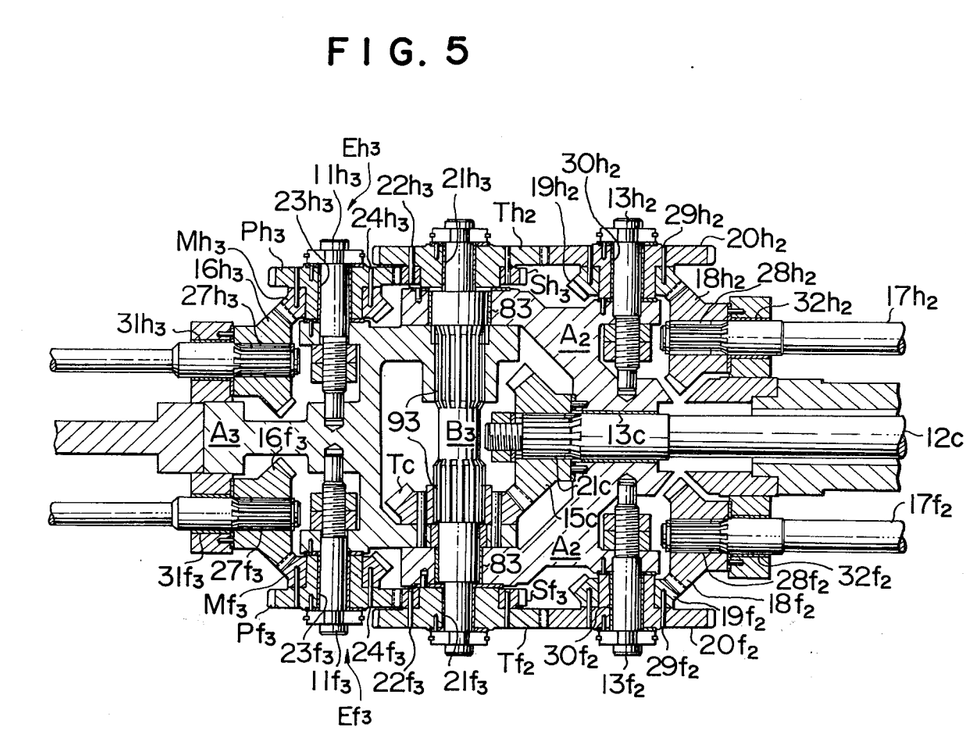
Figure 6:
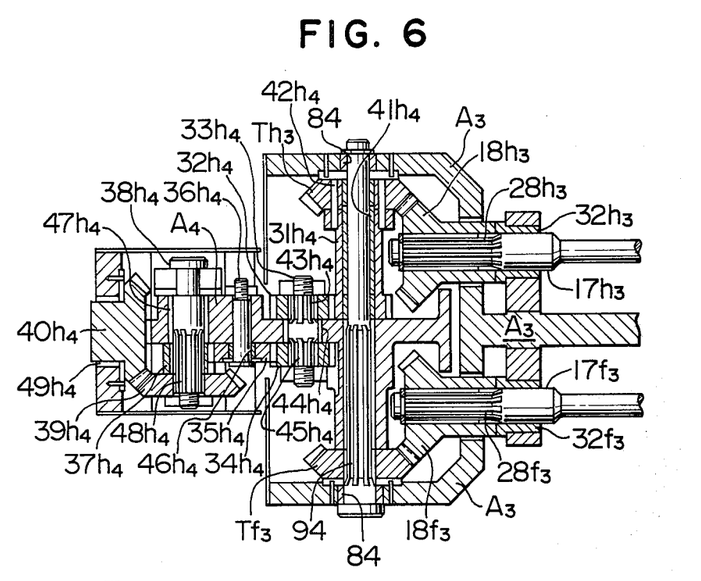

In the embodiment shown in FIGS. 5 and 6, a sun gear S$f$3 is fixedly mounted on the reduced diameter portion of the transmission gear T$f$2 by means of a pin 22$f$3 so that they are rotatable together. Between the planet gear P$f$3 and fixed shaft 11$f$3 is arranged a sleeve 22$f$3. An intermediate gear M$f$3 is fixedly mounted on the reduced diameter portion of the planet gear P$f$3 by means of a pin 24$f$3. Between the subsidiary arm A3 an and rotary shaft 17$f$3 is arranged sleeves 31$f$3 and 32$f$2. A pair of bevel gears 16$f$3 and 17$f$3 are mounted on the splines 27$f$3 and 28$f$3 arranged on either ends of the rotary shaft 17$f$3. The transmission gear T$f$3 and fourth joint shaft B4 are fixedly held together by use of a spline 94. The grasping arm A4 is fixed on the fourth joint shaft B4 by means of a spline 94 so that they are rotatable together.

In short, by the action of the epicyclic gear systems E$f$1, E$f$2 and E$f$3 arranged in the base arm A1, main arm A2 and subsidiary arm A3, even when any one or more of said arms A1, A2 and A3 is rotated, the grasping arm A4 will not change its absolute angular position so long as the sun gear S$f$1 remains unrotated.

Although, in the articulated arm of FIG. 6 the grasping arm A4 is rotatably mounted on the forward end of the subsidiary arm A3. In this case the grasping mechanism A5 may be mounted on the grasping arm A4 so that it can be swung up and down for an angle equal to the swinging movement of the subsidiary arm A3 in the same direction and plane.

Now the twisting movement gear train for the grasping mechanism A5 will be described hereinunder. This gear train employs an epicyclic gear system which has a quite similar construction to those referred previously, and is composed of a number of gears arranged in the arms A1, A2 and A3. Since the twisting movement gear train for the grasping mechanism having an equal construction to said swing-up and -down movement gear train for the grasping arm, in the shown embodiment the corresponding components are designated by the corresponding symbols with the letter $f$ displaced by $h$. Each epicyclic gear system E$h$ arranged between each two adjacent joint shafts B and consisting of a sun gear S$h$, planet gear P$h$, intermediate gear M$h$ and transmission gear T$h$, is almost equal to the swing-up and -down movement gear train for the grasping arm excepting that a sleeve 41$h$4 is inserted between the fourth joint shaft B4 and transmission gear T$h$3 (FIG. 6) for thereby allowing the free rotation of the transmission gear T$h$3, and hence will not be detailed further.

Now, a gear train $h$4 arranged between the grasping arm A4 and transmission gear T$h$3 will be described. In an arbitrary longitudinal position of the grasping arm A4 is arranged shafts 33$h$4 and 36$h$4 parallel to the fourth joint shaft B4. On these shafts are mounted a series of gears 31$h$4, 32$h$4, 34$h$4, 35$h$4, 37$h$4 and 39$h$4 for operatively connecting a transmission gear T$h$3 with a twisting gear 40$h$4. As will be detailed later, the twisting gear 40$h$4 is connected to the base shaft 51$h$5 of the grasping mechanism A5. It will be seen from the illustration that a pin 42$h$4 is inserted between the transmission gear T$h$3 and gear 31$h$4; a sleeve 41$h$4, between the gear 31$h$4 and fourth joint shaft B4; a pair of splines 43$h$4 and 45$h$4, between the gears 32$h$4, 34$h$4 and shaft 33$h$4; a sleeve 44$h$4, between the shaft 33$h$4 and grasping arm A3; a sleeve 46$h$4, between the gear 35$h$4 and shaft 36$h$4; a spline 48$h$4, between the gears 37$h$4, 39$h$4 and shaft 38$h$4; and a sleeve 49$h$4, between the twisting gear 40$h$4 and grasping arm 49$h$4. Thus, the twisting movement gear train is designed in such a manner that each two adjacent joint shafts B1, B2, B3 and B4 are connected by the epicyclic gear systems E$h$1, E$h$2, E$h$3, respectively, and the transmission gear T$h$3 is operatively connected to the twisting gear 40$h$4. Even when the arms A1, A2 and A3 are swing up or down, the grasping mechanism A5 will not be twisted so long as the sun gear S$h$1 in the twisting movement gear train remains unrotated.

Lastly, the grasping mechanism A5 will be described. The twisting gear 40$h$4 is fixedly mounted on the base shaft 63 which, in turn, is airtightly and rotatably mounted in a sleeve 64 arranged on one end of the grasping arm A4. Within the base shaft 63 is defined an air cylinder 65 having front and rear piston chambers, to which a fluid pressure can be alternatively supplied externally by way of circular ports 66 and 67 formed in the sleeve 64. On the forward end of the piston rod reciprocating within the air cylinder 65 are pivoted a pair of symmetrical grasping members 69 so that they are forced to open and close as the piston rod moves forward and backward. In this way the object to be transferred can be grasped or released by the grasping members 69. A pair of flexible air lines 70 for communicating the fluid pressure into the air cylinder 65 may be extended along the side wall of the grasping arm A4, subsidiary arm A3 and main arm A2 to a suitable position on the fixed base block X.

In the above description, the swing-up and -down movement gear train for the grasping arm and the twisting movement gear train have been discussed according to the embodiment. However, instead of mounting the sun gear S on the base end of each arm A and the transmission gear T on the forward end thereof, it is possible to mount the transmission gear T on the base end of each arm A and the sun gear S on the forward end thereof while connnecting the transmission gear T and the sun gear S by means of the intermediate gear M and the planet gear P. In other words, instead of serially connecting the joint shafts by the sun gear S, planet gear P, intermediate gear M and transmission gear T, the order of these gears may entirely be reversed such as in an order of the transmission gear T, intermediate gear M, planet gear P and sun gear S to achieve the function identical to those obtained by the previously described embodiment, and this should be considered as one of embodiments of the present invention.

It will be appreciated from the foregoing that the industrial robot of this invention provides the swing-up and -down movement and stretching movement of the multiple articulated arm as well as the swing-up and -down movement and twisting movement of the grasping arm. With the industrial robot of this invention, the grasping operation of the grasping mechanism A5 and the horizontal swivel operation of the swivel base block Y can be effected by use of ordinary means in a simple manner. If the output shaft of a pulse-controlled motor (not shown) is connected to each of the drive gear C in the stretching movement gear system, the drive gear D in the swing-up and -down movement gear system, the sun gear S$f$1 in the swing-up and -down movement gear system for the grasping arm and the sun gear S$h$1 in the twisting movement gear system for the grasping arm, and additionally if the output shaft of a pulse-controlled motor (not shown) is connected to the vertical shaft (not shown) of the swivel base block Y, then the grasping mechanism A5 of the industrial robot according to this invention will provide a three dimensional movement. Furthermore, all of said operation controls can be effected concentrically at the fixed base block X and swivel base block Y in response to the angular position of the components.

More specifically, if the absolute angular position of the object — which is to be grasped by the grasping mechanism A5 — measured at the center of the second joint shaft B2 for the main arm A2 is converted into a digital quantity and applied to a pulse motor connected to the drive gear D in the swing-up and -down movement gear system, then the angle to which the entire arm is to be swung up or down can be controlled in an easy manner. Similarly, if the angle of depression or elevation of the main arm A2 is measured with the visual line connecting the second joint shaft B2 and the object to be transferred using as a reference line, converted into a digital quantity and applied as a control signal to a phase motor connected to the drive gear C in the stretching movement gear system, then the distance to the object to be transferred can be determined in an easy manner by stretching the articulated arm. To hold the grasping arm A4 in a desired absolute angular position, for example, in a horizontal position, a digital signal corresponding to the absolute angle may be applied to a pulse motor connected to the sun gear S$f$1 in the swing-up and -down movement gear system for the grasping arm. In this case, if the sun gear S$f$1 is locked in a horizontally holding position, then the horizontal position of the grasping arm A4 may be maintained irrespective of the swing-up and -down movement and stretching movement of the other arms A1, A2 and A3. In just the same manner as the arm A4, the grasping mechanism A5 arranged on the forward end of the grasping arm A4 may easily be held in a desired angular position through the digital control of the pulse motor connected to the sun gear S$h$1 in the twisting movement gear system. When reached to the object to be transferred, the grasping mechanism A5 is operated by the fluid pressure so that it holds the object by pressing it from opposite sides. After that, the articulated arm is swung up or down or folded in or out, the grasping mechanism A5 is twisted and/or swivel base block Y is swivelled under digital control as described previously, thereby transferring the object to a desired position. The transfer operation completes when the object is released at the desired position. When transferring an open vessel or container filled with a liquid, to avoid the danger that the liquid overflows during the transfer operation, the sun gear S$f$1 may be locked to prevent the grasping mechanism A5 from twisting. Also, the swing-up and -down movement, stretching movement and swivel movement of the overall articulated arm A may be controlled. In such a manner, when the container is released it can be placed on a rest or the like at any intended position, or the liquid in the container can be poured into another container by twisting the grasping mechanism A4. Thus, it is possible to carry out a smooth transfer operation for a wide variety of objects.

Each of the above-referred operation systems is consisted of a gear train, and therefore the robot can provide a wide variety of desired movement by sequentially applying to each corresponding pulse motor the preset sequential instruction signals, or digital signals which correspond to the rotation angles. Such an operation control is highly effective and permits a precise positioning of the grasping mechanism by the open control method.

It will be appreciated from the foregoing that according to this invention the main arm A2 and subsidiary arm A3 of equal length are connected end to end to form an articulated arm A, so that the overall articulated arm can be swung up and down as if it were a one-piece member and the main and subsidiary arms A2 and A3 can be folded in and out for stretching movement. It will be seen that the second joint shaft B2 for the main arm A2 corresponds to the shoulder joint portion of human body, while the third joint shaft B3 for the subsidiary arm A3 corresponds to the elbow joint portion. With the above-detailed arrangement, the awkward movements of the conventional robots can be eliminated and the articulated arm of the robot provides a smooth movement which is quite similar to that of human arm. Notwithstanding its wide operation space, the articulated arm having both the swing-up and -down movement and stretching movement does not require very wide installation space above and below the base portion of the articulated arm as well as in the rear side of the articulated arm. Compared, especially, with a conventional circular cylindrical coordinates type robot, the robot of this invention occupies a reduced space. In short, the robot of this invention is advantageous in that it has a very wide operation space compared with its installation space.

Besides, since each of the swing-up and -down movement and stretching movement of the entire articulated arm and the swing-up and -down movement of the grasping arm can be controlled by the rotation angle, the motion transmission system can be simplified very much in construction. Despite its provision of an articulated arm, the robot of this invention can be controlled in accordance with a program which can be designed easily. It is needless to say that the foregoing construction, with which both the swing-up and -down movement and stretching movement of the articulated arm can be effected in a common plane, contributes to make said advantage remarkable. Since the stretching movement of the articulated arm is achieved by rotating the main arm A2 and subsidiary arm A3 of equal length for an equal angle and in opposite directions, any accessories such as a guide rail for guiding the forward end of the subsidiary arm A3 can be eliminated.

Corresponding to the wrist portion of human body, the grasping arm A4 supporting the grasping mechanism A5 is connected to the forward end of the subsidiary arm A3 so that the grasping A4 can be held in a desired absolute angular position irrespective of said swing-up and -down movement and stretching movement of the articulated arm. This makes the articulated arm further resemble the hand and arm of human body, so that the articulated arm can be used in transferring not only various solid objects but also open vessels or containers filled with a liquid without overflowing the liquid.

Furthermore, the entire articulated arm can be swinged in a vertical plane and also can be swivelled horizontally for 360°, while the grasping mechanism A5 can be twisted on its axis. This enables the industrial robot of this invention not only to transfer various objects, but also to carry out assembly works and to pour a liquid from one container to the other.

The arrangement of the power input shaft, or the first joint shaft (which serves as the power input shaft of the motion transmission systems adapted for the swing-up and -down movement and stretching movement of the articulated arm and the swing-up and -down movement and twisting movement of the grasping arm) within the base block X, simplifies the construction of the robot. The gear trains involves no slip at all during operation and the rotation of the motor shaft can be transmitted faithfully to each follower portion. This not only minimizes the control error and improves the response accuracy of the robot, but also allows an open control by use of pulse motors, thereby simplifying the control system of the robot.

Since the motion transmission systems are consisted by only the gear trains and a connecting rod or rotary shaft, the errors in the motion transmission can be kept within the allowable tolerance. Thus, it is not necessary to change or modify the program of the computer, and the robot can be effectively controlled by the computer. Further, the transmission of the motion is made not only by the gears but also the connecting rod, so that each arm can be made compact and light-weight, providing a smooth movement for an increased angle. The multiple articulated arm can be bent easily at its joints to have a center-elevated or center-depressed configuration (FIG. 11), so that the forward grasping mechanism can be reached to any desired portions within a casing, for example, without changing the relative positions of the object and the base block of the robot.

Only the lead wires for electric signals and fluid pressure pipes for the grasping mechanism are required in this robot as the accessories thereof and other accessories can be eliminated. This contributes to provide a high efficiency grasping mechanism of simplified construction, facilitating to obtain an industrial robot having an explosion-proof construction.

What is claimed are:

1. An industrial robot having a multiple articulated arm mechanism, wherein at least two separate arms, or a main arm (A2) and a subsidiary arm (A3) are operable in a common plane, the industrial robot is characterized in that the main arm (A2) is fixedly connected at its base end to a second joint shaft (B2) coupled to a power unit so that the main arm is rotatable around the axis of the second joint shaft; the subsidiary arm (A3) is fixedly connected at its base end to a third joint shaft (B3) rotatably mounted on the forward end of the main arm (A2) so that the subsidiary arm is rotatable around the axis of the third joint shaft; a sun gear (Sc) is rotatably mounted on the second joint shaft (B2); in engagement with said sun gear, a planet gear (Pc) is rotatably mounted on a fixed shaft (11c) arranged in a suitably selected longitudinal position of the main arm (A2); an intermediate gear (Mc) is rotatably mounted on said fixed shaft (11c) and securedly connected to said planet gear (Pc) so that they are rotatable together; a transmission gear (Tc) fixedly mounted on said third joint shaft (B3) is operatively connected to the intermediate gear (Mc) through a connecting rod so that the second and third joint shafts (B2) and (B3) are connected to each other by way of the stretching movement epicyclic gear system (Ec) consisted of said gears (Sc, Pc, Mc and Tc); and the gear ratio among said gears (Sc, Pc, Mc and Tc ) are so selected as to satisfy a relation of $(t2 \times t4)/(t1 \times t3) = 2$ (wherein, $t4$, $t3$, $t2$ and $t1$ represent the number of teeth carried on the gears Sc, Pc, Mc and Tc, respectively, in this order), so that upon transmitting power to the second joint shaft B2 to swing the main arm (A2) up or down around the axis of the second joint shaft (B2), while the subsidiary arm (A3) can be swung down or up, or swung in the opposite direction, for an equal angle in the common plane.

2. An industrial robot having a multiple articulated arm mechanism, wherein at least a primary arm and a secondary arm are operable in a common plane, the industrial robot is characterized in that the primary arm is fixedly connected at its base end to a primary joint shaft coupled to a power unit so that the primary arm is rotatable around the axis of the primary joint shaft the secondary arm is fixedly connected at its base end to a secondary joint shaft rotatably mounted on the forward end of the primary arm so that the secondary arm is rotatable around the axis of the secondary joint shaft; a sun gear is rotatably mounted on the primary joint shaft; in engagement with said sun gear, a planet gear is rotatably mounted on a fixed shaft arranged in a suitably selected longitudinal position of the primary arm; an intermediate gear is mounted on said fixed shaft and securely connected to said planet gear so that these gears are rotatable together; a transmission gear fixedly mounted on the secondary joint shaft is operatively connected to the intermediate gear through a connecting rod so that the primary and secondary joint shafts are connected to each other by way of the swing-up and -down movement epicyclic gear system for the secondary arm consisted of said sun gear, planet gear, intermediate gear and transmission gear; and the gear ratio among said gears are so selected as to satisfy a relation of $(t1' \times t3')/(t2' \times t4') = 1$ (wherein, $t4'$, $t3'$, $t2'$ and $t1'$ represent the number of teeth carried on the sun gear, planet gear, intermediate gear and transmission gear, respectively, in this order), so that upon transmitting power to one of said two joint shafts the arm mounted on the other joint shaft can be swung up or down around the axis of said one of joint shafts, while the arm mounted on said the other arm can be shifted parallel in the common plane without changing its absolute angular position.

3. An industrial robot having a multiple articulated arm mechanism, wherein at least two separate arms, or a subsidiary arm (A3) and grasping arm (A4) are operable in a common plane, the industrial robot is characterized in that the subsidiary arm (A3) is fixedly connected at its base end to a third joint shaft (B3) coupled to a power unit so that the subsidiary arm is rotatable around the axis of the third joint shaft (B3); the grasping arm (A4) is fixedly connected at its base end to a fourth joint shaft (B4) rotatably mounted on the forward end of the subsidiary arm (A3) so that the grasping arm (A4) is rotatable around the axis of the fourth joint shaft (B4); a sun gear (S$f$3) is rotatably mounted on the third joint shaft (B3); in engagement with said sun gear, a planet gear (P$f$3) is rotatably mounted on a fixed shaft (11$f$3) arranged in a suitably selected longitudinal position of the subsidiary arm (A3); an intermediate gear (M$f$3) is mounted on said fixed shaft (11$f$3) and securedly connected to said planet gear (P$f$3) so that these gears (M$f$3) and (T$f$3) are rotatable together; a transmission gear (T$f$3) fixedly mounted on the fourth joint shaft (B4) is operatively connected to the intermediate gear (M$f$3) through a connecting rod so that the third and fourth joint shafts (B3) and (B4) are connected to each other by way of the swing-up and -down movement epicyclic gear system (E$f$3) for the grasping arm consisted of said gears (S$f$3, P$f$3, M$f$3 and T$f$3); and the gear ratio among said gears (S$f$3, P$f$3, M$f$3 and T$f$3) are so selected as to satisfy a relation of $(t1' \times t3')/(t2' \times t4') = 1$ (wherein, $t4'$, $t3'$, $t2'$ and $t1'$ represent the number of teeth carried on the gears S$f$3, P$f$3, M$f$3 and T$f$3, respectively, in this order), so that upon transmitting power to the third joint shaft (B3) the subsidiary arm (A3) can be swung up or down around the axis of the third joint shaft (B3), while the grasping arm (A4) can be shifted parallel in the common plane without changing its absolute angular position.

4. An industrial robot having a multiple articulated arm mechanism, wherein at least a primary arm and a secondary arm are operable in a common plane, the industrial robot is characterized in that the primary arm is fixedly connected at its base end to a primary joint shaft coupled to a power unit so that the primary arm is rotatable around the axis of the primary joint shaft the secondary arm is fixedly connected at its base end to a secondary joint shaft rotatably mounted on the forward end of the primary arm so that the secondary arm is rotatable around the axis of the secondary joint shaft; a sun gear is rotatably mounted on the primary joint shaft; in engagement with said sun gear, a planet gear is rotatably mounted on a fixed shaft arranged in a suitably selected longitudinal position of the primary arm; an intermediate gear is mounted on said fixed shaft and securedly connected to said planet gear so that these gears are rotatable together; a transmission gear fixedly mounted on the secondary joint shaft is operatively connected to the intermediate gear through a connecting rod so that the primary and secondary joint shafts are connected to each other by way of the swing-up and -down movement epicycle gear system for the secondary arm consisting of said sun gear, planet gear, intermediate gear and transmission gear; and the gear ratio among said gears are so selected as to satisfy a relation of $(t1' \times t3')/(t2' \times t4') = 1$ (wherein, $t4'$, $t3'$, $t2'$ and $t1'$ represent the number of teeth carried on the sun gear, planet gear, intermediate gear and transmission gear, respectively, in this order); a gear is rotatably mounted on the arm mounted on one of said joints so that it is operative in association with the motion transmission gear; and said gear is fixed to a grasping mechanism so that upon transmitting power to the other joint shaft to swing the other arm up or down around the axis of said other joint shaft, the grasping mechanism mounted on said one of arms can be moved together with said the other arm without twisting.

5. An industrial robot having a multiple articulated arm mechanism, wherein at least two separate arms, or a subsidiary arm (A3) and a grasping arm (A4) are operable in a common plane, the industrial robot is characterized in that the subsidiary arm (A3) is fixedly connected at its base end to a third joint shaft (B3) coupled to a power unit so that the subsidiary arm is rotatable around the axis of the third joint shaft (B3); the grasping arm (A4) is fixedly connected at its base end to a fourth joint shaft (B4) rotatably mounted on the forward end of the subsidiary arm (A3) so that the grasping arm (A4) is rotatable around the axis of the fourth joint shaft (B4); a sun gear (S$h$3) is rotatably mounted on the third joint shaft (B3); in engagement with said sun gear, a planet gear (P$h$3) is rotatably mounted on a fixed shaft (11$h$3) arranged in a suitably selected longitudinal position of the subsidiary arm (A3); an intermediate gear (M$h$3) is mounted on said fixed shaft (11$h$3) and securely connected to said planet gear (P$h$3) so that these gears (M$h$3) are rotatable together; a transmission gear (T$f$3) fixedly mounted on the fourth joint shaft (B4) is operatively connected to the intermediate gear (M$h$3) through a connecting rod so that the third and fourth joint shafts (B3) and (B4) are connected to each other by way of the swing-up and -down movement epicyclic gear system (E$h$4) for the grasping arm consisted of said gears (S$h$3, P$h$3 and T$h$3); and the gear ratio among said gears (S$h$3, P$h$3, M$h$3 and T$h$3) are so selected as to satisfy a relation of $(t1' \times t3')/(t2' \times t4') = 1$ (wherein, $t4'$, $t3'$, $t2'$ and $t1'$ represent the number of teeth carried on the gears S$h$3, P$h$3, M$h$3 and T$h$3, respectively, in this order); a gear (40$h$4) is rotatably mounted on the grasping arm (A4) so that it is operative in association with the motion transmission gear (T$h$3); and said gear (40$h$4) is fixed to the grasping mechanism (A5) so that upon transmitting power to the third joint shaft (B3) to swing the subsidiary arm (A3) up or down around the axis of the third joint shaft (B3), the grasping mechanism (A5) mounted on said grasping arm (A4) can be moved together with the subsidiary arm (A3) without twisting.

6. An industrial robot provided with a multiple articulated arm mechanism, wherein an arm (A3) is connected to a main arm (A2) which is connected to a base arm (A1) which is connected to the power unit at the first joint shaft (B1), and each of said arms (A1, A2 and A3) is rotatable in a common plane around the axis of a corresponding one of first, second and third joint shafts, (B1, B2 and B3), the industrial robot being characterized in that:
- a planet gear (P2d) is fixedly mounted on the second joint shaft (B2) which is rotatably mounted on the forward end of said base arm (A1);
- a sun gear (Sc) is rotatably mounted on said second joint shaft (B2);
- a first joint shaft (B1) is fixedly mounted on the base end of said base arm (A1);
- drive gear (Sd and C) are rotatably mounted on said first joint shaft (B1);
- a drive gear (D) is fixedly mounted on said first joint shaft (B1);
- the drive gear (Sd) is fixedly mounted on a base block (X) and operatively engages said sun gear (Sc) and the drive gear (C) engages said planet gear (P2d) so that the first joint shaft (B1) is connected to the second joint shaft (B2) by way of the swing-up and-down movement epicyclic gear system (Ed) comprising said gears (Sc, Sd, P2d and C), for thereby connecting the second joint shaft (B2) to the power unit; and
- the gear ratio between said gears (Sc, Sd, P2d and C) is so selected as to satisfy a relation of $(t6 \times t7)/(t8 \times t4) = 1$ (wherein, $t4, t6, t7$ and $t8$ represent the number of teeth carried on the gears Sc, Sd, P2d and C, respectively, in this order), so that upon rotating the drive gear (D) the base arm (A1) can be swung around the first joint shaft (B1) to thereby rotate the second joint shaft (B2) around the first joint shaft (B1) for swinging up or down the main arm (A2) having the planet gear (P2d) fixed thereon around the second joint shaft (B2) for an angle, and simultaneously rotating the sun gear (Sc) around the first joint shaft (B1) to thereby swing the subsidiary arm (A3) having a transmission gear (Tc) fixed thereon and associated with said sun gear (Sc) up or down, or in the same direction as the main arm (A2), for an angle in the common plane.

7. An industrial robot provided with a multiple articulated arm mechanism according to claim 6, wherein a planet gear (P1d) engages the sun gear (Sc) with the drive gear (Sd), the planet gear (P1d) being rotatably mounted on the second joint shaft (B2) so that it is engaged with the drive gear (Sd) which is loosely mounted on the first joint shaft (B1), said planet gear (P1d) being securely connected to the sun gear (Sc) so that they are rotatable together, and the gear ratio between the gears (P1d, Sd, P2d and C) are so selected as to satisfy a relation of $(t6 \times t7)/(t5 \times t8) = 1$, wherein $t5, t6, t7$ and $t8$ represent the number of teeth carried on the gears (P1d, Sd, P2d and C), respectively, in this order.

8. An industrial robot provided with a multiple articulated arm mechanism according to claim 7, wherein a grasping arm (A4) is fixedly mounted on the forward end of the subsidiary arm (A3) and a grasping mechanism (A5) is mounted on said grasping arm (A4) so that, when the subsidiary arm (A3) is swung up or down for an angle, said grasping mechanism (A5) can be swung up or down, or can be swung in the same direction, for an equal angle in the common plane.

9. An industrial robot provided with a multiple articulated arm mechanism according to claim 7, wherein:
- a fourth joint shaft (B4) is rotatably mounted on the forward end of the subsidiary arm (A3) and the grasping arm (A4) is fixedly mounted at the base thereof on said fourth joint shaft (B4) so that each of the arms (A1, A2, A3 and A4) is rotatable in a common plane around the axis of the corresponding joint shaft (B1, B2, B3 and B4);
- sun gears (Sf and Sh) are rotatably mounted on the joint shaft (A1, A2 and A3);
- planet gears (Pf and Ph) are rotatably mounted on the fixed shaft (11f and 11h) respectively so that they are engaged with said sun gears (Sf and Sh) respectively, said fixed shafts (11f and 11h) being arranged in a suitably selected longitudinal position of the arms (A1, A2 and A3);
- intermediate gears (Mf and Mh) are mounted on said fixed shafts (11f and 11h), respectively, and fixedly connected to said planet gears (Pf and Ph) respectively so that these pairs of gears (Pf, Mf; Ph, Mh) are rotatable together;
- transmission gears (Tf and Th) rotatably mounted on said joint shaft (B2 and B3) are operatively connected to said intermediate gears (Mf and Mh) respectively;
- a transmission gear (Tf3) fixedly mounted on the fourth shaft (B4) is operatively connected to the intermediate gear (Mf3) in the subsidiary arm (A3);
- a transmission gear (Th4) associated with the grasping mechanism (A5) is operatively connected to an intermediate gear (Mh3) in the subsidiary arm (A3), so that epicyclic gear systems (Ef and Eh) are arranged between the joint shafts (B1, B2, B3 and B4);
- and the gear ratio between the gears (S, P, M and T) composing said epicyclic gear systems (Ef and Eh) are so selected as to satisfy a relation of $(t1' \times t3')/(t2' \times t4') = 1$ (wherein, $t4', t3', t2'$ and $t1'$ represent the number of teeth carried on the gears S, P, M and T, respectively, in this order) so that even when the arms (A1, A2 and A3) are swung up or down, the grasping arm (A4) can be shifted parallel without changing its absolute angular position and hence the grasping mechanism (A5) can be moved without changing its absolute twisting angle.

* * * * *